No. 888,270.

PATENTED MAY 19, 1908.

A. J. STRUNK.
WAGON BRAKE.
APPLICATION FILED MAR. 25, 1907.

2 SHEETS—SHEET 1.

Witnesses
G. R. Thomas

Inventor
A. J. Strunk
By
Attorneys

No. 888,270.

PATENTED MAY 19, 1908.

A. J. STRUNK.
WAGON BRAKE.
APPLICATION FILED MAR. 25, 1907.

2 SHEETS—SHEET 2.

Witnesses

Inventor
A. J. Strunk

By

Attorneys

UNITED STATES PATENT OFFICE.

AARON J. STRUNK, OF BUNCH, IOWA.

WAGON-BRAKE.

No. 888,270.　　　Specification of Letters Patent.　　　Patented May 19, 1908.

Application filed March 25, 1907. Serial No. 364,272.

*To all whom it may concern:*

Be it known that I, AARON J. STRUNK, a citizen of the United States, residing at Bunch, in the county of Davis, State of Iowa, have invented certain new and useful Improvements in Wagon-Brakes; and I do hereby declare the following to be a full, clear, and exact description of the invention, such as will enable others skilled in the art to which it appertains to make and use the same.

This invention relates to new and useful improvements in wagon brakes, and it has particular reference to a wagon brake which is fixed to the body and which is operated by the movement of the latter with relation to the truck upon which it is supported.

Figure 1:
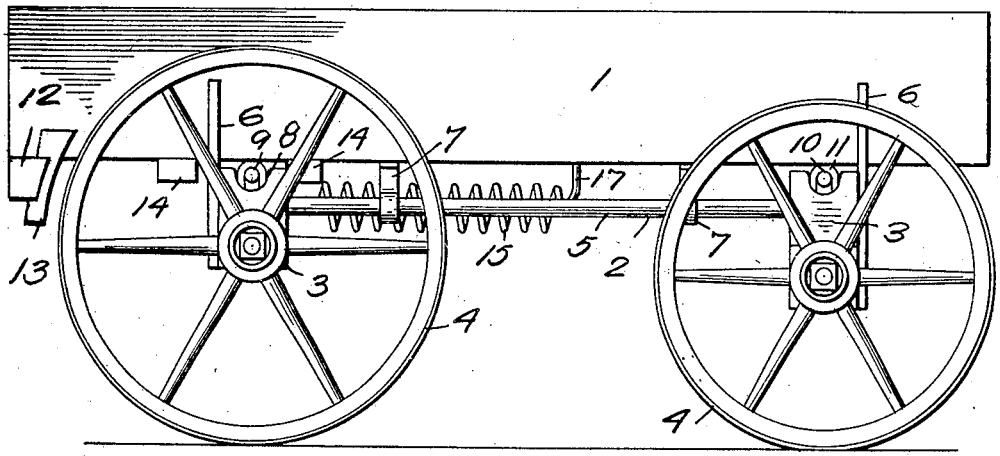
Figure 2:
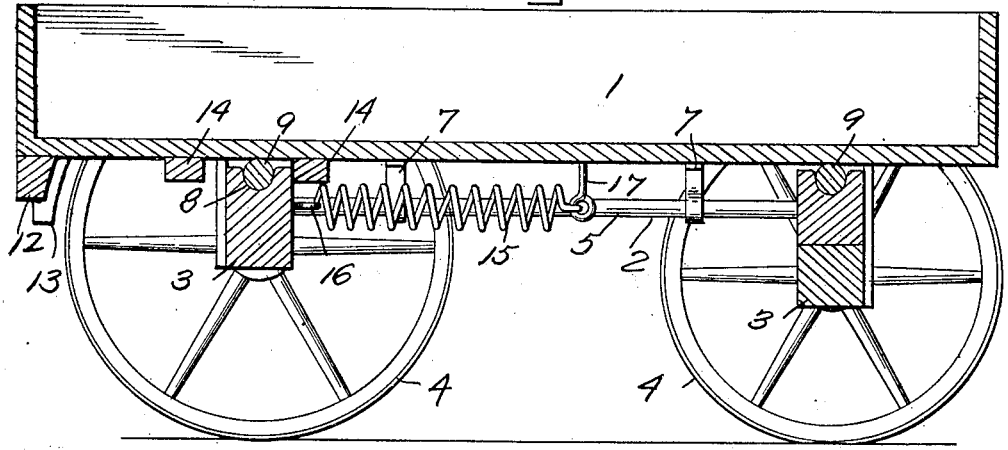
Figure 5:
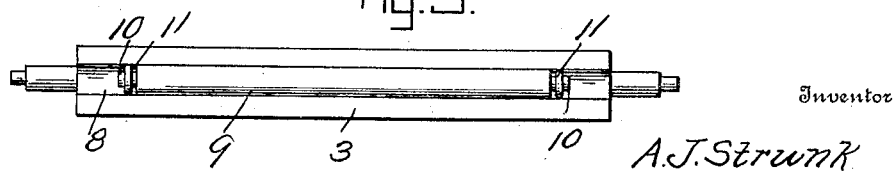
Figure 3:
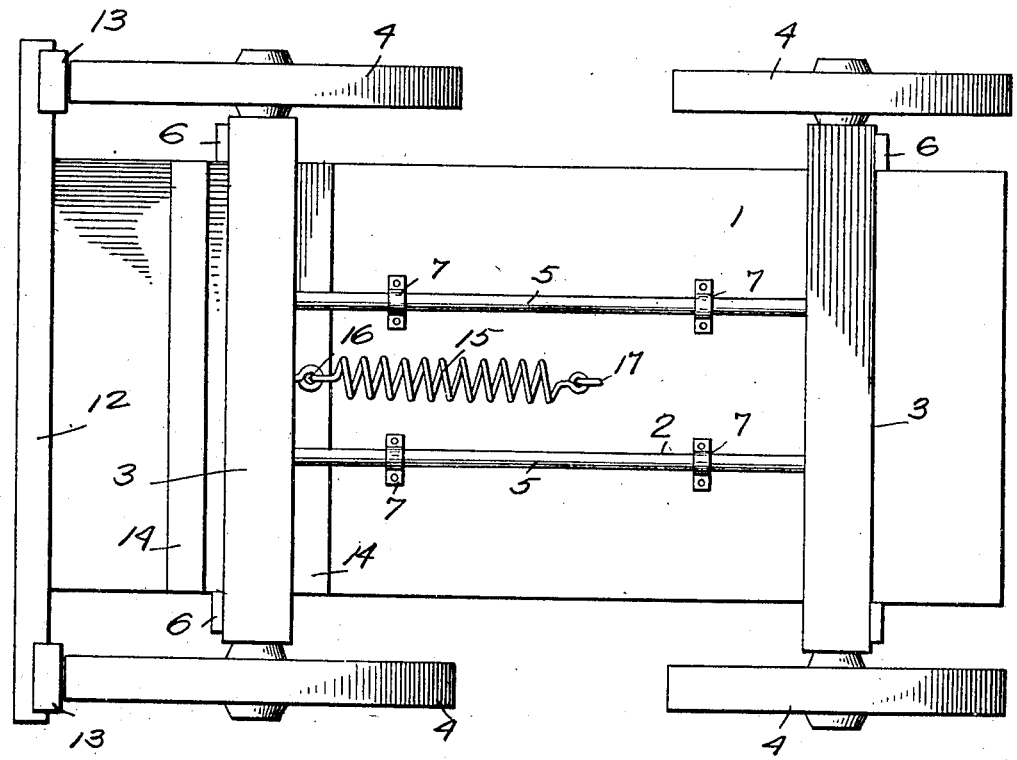
Figure 4:
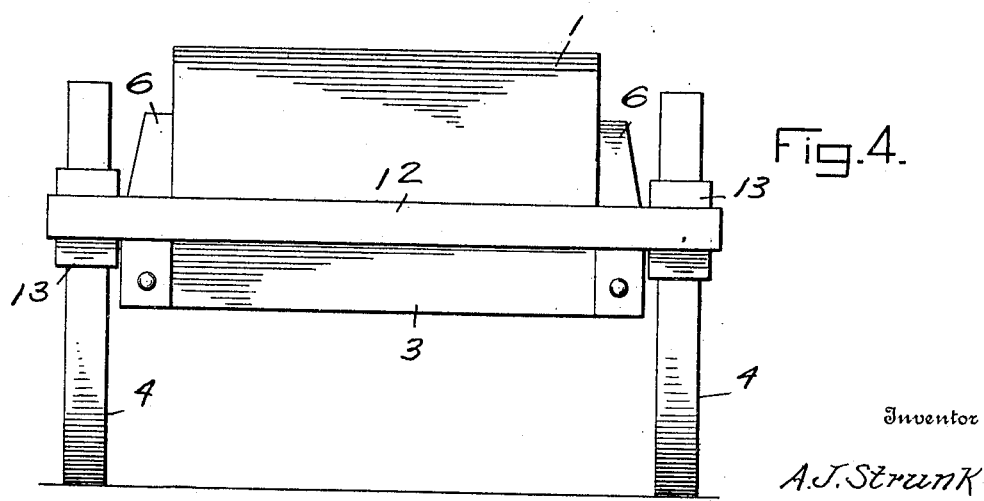

In connection with a brake of the above type, the invention aims primarily to provide a novel construction, combination and arrangement of parts, the details of which will appear in the course of the following description, in which reference is had to the accompanying drawings forming a part of this specification, like characters of reference designating similar parts throughout the several views, wherein:

Figure 1 is a side elevation of a wagon provided with an automatic brake, constructed in accordance with the present invention. Fig. 2 is a central longitudinal sectional view thereof. Fig. 3 is a bottom plan view thereof. Fig. 4 is a rear end elevation thereof, and Fig. 5 is a top plan view of one of the axle-trees which coacts with the brake mechanism in its function, the other axle-tree being duplicated in so far as the construction disclosed is concerned.

Referring specifically to the accompanying drawings, the numeral 1 designates a vehicle body, and the numeral 2 a supporting truck, slidable with relation thereto. The truck 2 includes the axle-trees 3, the wheels 4, rigid connections 5 between said axle-trees, and vertical posts 6 arranged on the axle-trees adjacent the several wheels and designed to overlie the sides of the wagon body as guides for the latter in its movement with relation to the truck. To facilitate such movement, the truck body 1 is supported by hangers 7, surrounding the connections 5 and permitting of sliding movement of said hangers on these connections upon displacement of said body 1.

The axle-trees 3 are formed in their upper surfaces with grooves 8, in which are disposed friction rollers 9, mounted longitudinally of said axle-trees, and having at their ends trunnions 10, which are journaled in suitable bearings 11, provided at the ends of the grooves 8.

The body 2 is provided at its rear end with a brake beam 12, which projects on each side thereof, and carries the shoes 13 for frictional engagement with the rear wheels 4. The shoes 13 are moved with the body 1 into engagement with said wheels. Such movement is restricted in either direction by spaced parallel cleats 14, arranged transversely upon the rear portion of the body 1, and being disposed in spaced relation on each side of the rear axle-tree 3, which is arranged therebetween.

The body 1 is normally held in its rearmost position with relation to the truck 2 by the action of a retractile coil spring 15, having its one end secured to an eye 16 provided centrally upon the rear-axle tree 3, and having its other end secured to an eye 17, provided centrally upon the forward portion of the body 1, it being understood that the spring 15 is arranged between the parallel connections 5.

The brake is automatic in its action and is applied by the gravitating movement of the vehicle body when the latter is in an inclined position, as in going down a hill. The greater the incline, the greater the force with which the brake is applied. It will be apparent that the weight of the body 1 is sufficient when the latter is inclined, to cause the same to move forwardly upon its truck against the tension of the spring 15, and in such action to move the shoes 13 against the rear wheels 4. In going uphill, the action is reversed for the same reason, and on a level or an approximate level, the spring 15 holds the body in its rearmost position with relation to the truck 2, as will be readily understood. The body 1 in its movement in either direction, travels upon the friction rollers 9, so that its action is quick, easy, and efficacious.

From the foregoing description, it will be seen that simple and efficient means are provided for accomplishing the objects of the invention, but while the elements herein shown and described are well adapted to serve the functions set forth, it is obvious that various minor changes may be made in the proportions, shape and arrangement of the several parts without departing from the spirit and scope of the invention as defined in the appended claims.

What is claimed is:

1. In a device of the class described, the combination with a wheeled truck, of a wagon body, means to hold said body on the truck in longitudinal slidable relation, a transverse brake beam fixed on the body rearwardly of the wheels of said truck, means for limiting the movement of said body in either direction with relation to the truck, and a coil spring independent of the brake and adapted to restore the body to normal.

2. In a device of the class described, the combination with a wheeled truck, of a wagon body supported for longitudinal movement on the truck, a transverse brake beam fixed on said body rearwardly of the wheels of said truck, means to limit the movement of the body in either direction with relation to the truck, roller bearings on said truck, means to hold the body down on the bearings, and a coil spring independent of the wagon brake adapted to hold the body in normal position.

In testimony whereof, I affix my signature, in presence of two witnesses.

AARON J. STRUNK.

Witnesses:
J. M. HICKS,
A. T. BISHOP.